US010637049B2

(12) United States Patent
Yang

(10) Patent No.: US 10,637,049 B2
(45) Date of Patent: Apr. 28, 2020

(54) COMPOSITE ELECTRODE MATERIALS

(71) Applicants: PROLOGIUM TECHNOLOGY CO., LTD., Taoyuan (TW); PROLOGIUM HOLDING INC., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 0 days.

(21) Appl. No.: 16/253,928

(22) Filed: Jan. 22, 2019

(65) Prior Publication Data
US 2019/0252676 A1    Aug. 15, 2019

(30) Foreign Application Priority Data
Feb. 14, 2018    (TW) .............................. 107105391 A

(51) Int. Cl.
H01M 4/00    (2006.01)
H01M 4/36    (2006.01)
H01M 10/0525    (2010.01)
H01M 4/13    (2010.01)
H01M 10/058    (2010.01)
H01M 4/02    (2006.01)

(52) U.S. Cl.
CPC ............. *H01M 4/366* (2013.01); *H01M 4/13* (2013.01); *H01M 10/058* (2013.01); *H01M 10/0525* (2013.01); *H01M 2004/021* (2013.01)

(58) Field of Classification Search
CPC .... H01M 4/366; H01M 4/13; H01M 10/0525; H01M 10/058; H01M 2004/027; H01M 2004/021; H01M 4/02
USPC ......................................................... 429/209
See application file for complete search history.

(56) References Cited

U.S. PATENT DOCUMENTS

| 10,263,279 | B2* | 4/2019 | Yushin | H01M 10/0525 |
| 2002/0012846 | A1* | 1/2002 | Skotheim | H01M 2/1673 |
| | | | | 429/231.95 |
| 2004/0253518 | A1 | 12/2004 | Hosoya et al. | |
| 2013/0316237 | A1* | 11/2013 | Miki | H01M 4/364 |
| | | | | 429/218.1 |
| 2014/0255780 | A1* | 9/2014 | Mikhaylik | H01M 2/1626 |
| | | | | 429/213 |
| 2016/0020460 | A1* | 1/2016 | Yang | H01M 4/624 |
| | | | | 429/231.95 |

(Continued)

FOREIGN PATENT DOCUMENTS

CN    1292505 C    12/2006
JP    2008226463 A    9/2008

*Primary Examiner* — Nicholas P D'Aniello
(74) *Attorney, Agent, or Firm* — Rabin & Berdo, P.C.

(57) ABSTRACT

The invention discloses a composite electrode materials. The composite electrode materials of this invention includes at least one active material. The active material is coated an artificial passive film on its surface to effectively block the contact of the electrolyte and the active material to prevent unnecessary consumption of Li-ions. Also, there have a middle layer and an outer layer outside of the artificial passive film. Both of the middle layer and the outer layer are composed of the gel/liquid electrolyte and the solid electrolyte, but with different concentration ratios. Therefore, the better ion-conduction is achieved with reduced charge-transfer resistance and reduced amount of organic solvent.

14 Claims, 3 Drawing Sheets

(56) References Cited

U.S. PATENT DOCUMENTS

2017/0324097 A1* 11/2017 Lee .................. H01M 10/0569

* cited by examiner

COMPOSITE ELECTRODE MATERIALS

BACKGROUND OF THE INVENTION

Cross References to Related Applications

The present application claims priority to Taiwanese Patent Application 107105391 in the Taiwanese Patent Office on Feb. 14, 2018, the entire contents of which is being incorporated herein by reference.

FIELD OF INVENTION

The present invention relates to an electrode materials, in particular to a composite electrode materials adapted for a lithium ion secondary battery system.

RELATED ART

The liquid electrolyte is usually used for the existing lithium ion secondary battery as a medium for the lithium ion transport. However, the volatile nature of the liquid electrolyte may adversely affect the human body and the environment. Moreover, it is also a great security concern for the battery users due to the flammability of the liquid electrolyte.

Furthermore, one reason for the destabilization of lithium batteries is the greater surface activity of the negative electrode and the higher voltage of the positive electrode. When the liquid electrolyte is directly contacted to the electrodes, the interfaces therebetween is destabilized and the exothermic reaction is occurred to form a passivation layer. There reactions would consume the liquid electrolyte and the lithium ion and generate heat. When a local short circuit occurs, the local temperature rises rapidly. The passivation layer will become unstable and release heats. This exothermic reaction is cumulative to cause the temperature of the whole battery to continue to rise. The one of safety concerns of using a battery is that once the battery temperature is increased to a starting temperature (trigger temp.), the thermal runaway is initiated to cause an ignition or explosion of the battery. That is a major safety issue for use.

In recent years, the solid electrolytes is a focusing research. The ionic conductivity of the solid electrolytes is similar to the ionic conductivity of the liquid electrolytes, without having the property of evaporating and burning. Also, the interfaces between the solid electrolytes and the surface of active materials is relatively stable, regardless chemically or electrochemically. However, differing from the liquid electrolyte, the contact area between the solid electrolytes with the active materials is quite small, the contact surface is poor, and the charge transfer rate constant is low. So there is a problem that the charge transfer interface resistances of the active materials with the positive and negative electrodes are large. It is adverse for the efficient transmission of lithium ions. Therefore, it is still difficult to completely replace the liquid electrolytes by the solid electrolytes.

Therefore, there is a need to provide a improving a composite electrode materials to solve the above-mentioned problems.

SUMMARY OF THE INVENTION

It is an objective of this invention to provide a composite electrode materials to overcome the forgoing shortcomings. The artificial passive film (APF) is used to efficiently prevent the liquid electrolytes to contact with the active materials. Therefore, the unnecessary lithium ion consumption and the attenuation of the lithium battery can be avoided.

Also, it is another objective of this invention to provide a composite electrode materials including a middle layer and an outer layer constructed with different percentages of the solid electrolyte and the gel/liquid electrolyte. Therefore, the problems of the high resistance of the charge transfer and poor contact surface, caused by the directly contact of the solid electrolyte and the active material, are eliminated. The amount of organic solvents is reduced and the safety of the battery is improved.

In order to implement the abovementioned, this invention discloses a composite electrode materials, which includes an active material, an artificial passive film, a middle layer and an outer layer. The artificial passive film covers the active material, and the middle layer and the outer layer cover outside in sequence. Both the middle layer and the outer layer include a solid electrolyte and a gel/liquid electrolyte. The content of the gel/liquid electrolyte is more than a content of the solid electrolyte in middle layer. The content of the solid electrolyte is more than the content of the gel/liquid electrolyte in outer layer. The active material is coated an artificial passive film on its surface to effectively block the contact of the electrolyte and the active material to prevent unnecessary consumption of Li-ions, which may lead the attenuation of the lithium battery. Also, the middle layer and the outer layer is formed with different concentration ratios. Therefore, the better ion-conduction is achieved with reduced charge-transfer resistance and reduced amount of organic solvent. The amount of the gel/liquid electrolytes is significant reduced. The problems of the high resistance of the charge transfer and poor contact surface, caused by the directly contact of the solid electrolyte and the active material, are eliminated. The better ion-conduction is achieved with improved safety.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The invention provides a composite electrode materials. Both the solid electrolytes and the gel/liquid electrolytes have their own advantages and disadvantages. Nowadays, it is still difficult to completely replace the liquid electrolytes by the solid electrolytes. Therefore, it is a more appropriate formula to mix with the solid electrolytes and the gel/liquid electrolytes. The advantages of both these two kind of electrolytes are utilized by distribution configuration with different percentages, and the disadvantages of the electrolytes are eliminated or minimized to achieve better ion-conduction. Also, it is considered that the active materials and the gel/liquid electrolytes would form a passive protective film. The artificial passive film (APF) is used to efficiently prevent the gel/liquid electrolytes to contact with the active materials. The following is a description of the active material structure and the electrode structure.

Figure 1:
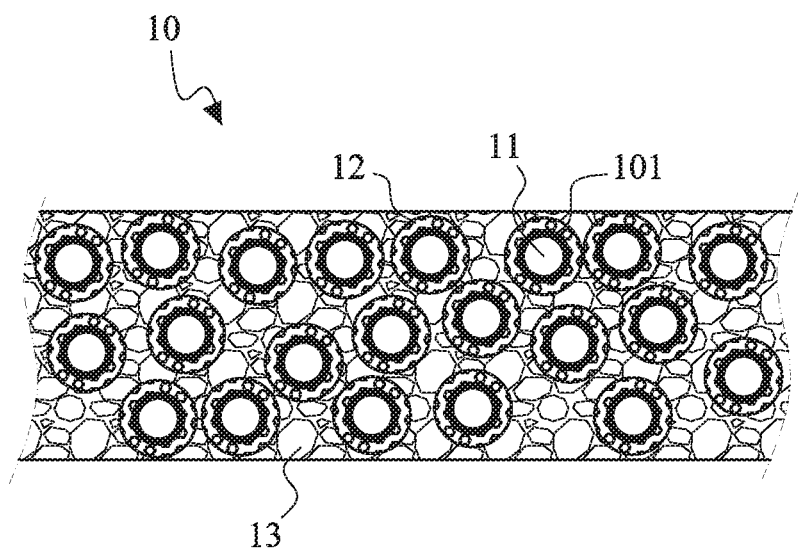
FIG. 1 is a schematic diagram of the composite electrode materials of this invention
Figure 2:
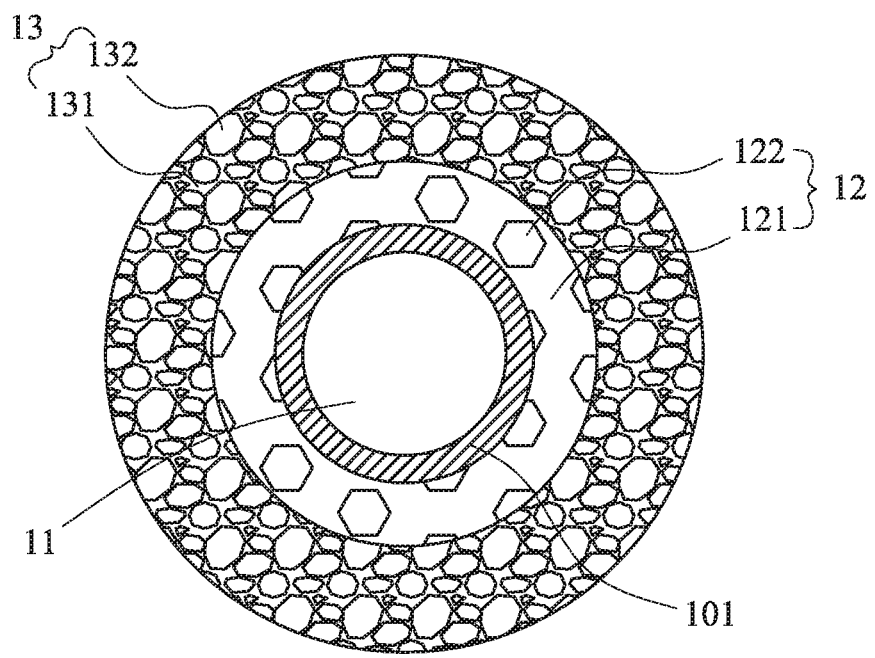
FIG. 2 is a schematic diagram with partial enlargement of the composite electrode materials of this invention.
Figure 3:
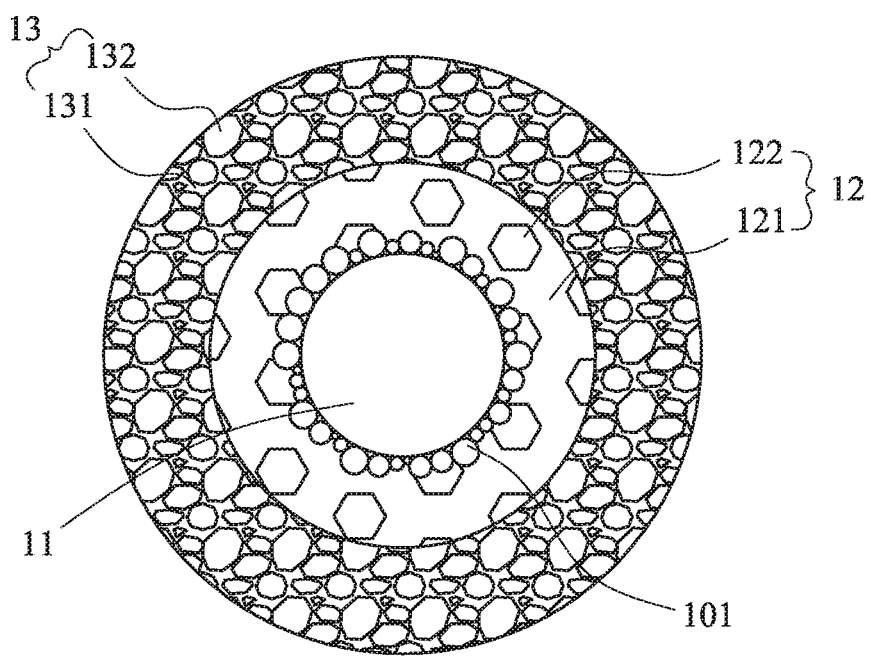
FIG. 3 is a schematic diagram with partial enlargement of another embodiment the composite electrode materials of this invention.

Please refer to FIGS. 1-3, which is a schematic diagram of the composite electrode materials of this invention, a schematic diagram with partial enlargement of the composite electrode materials of this invention, and a schematic diagram with partial enlargement of another embodiment the composite electrode materials of this invention. The composite electrode materials 10 of this invention includes an active material 11, a middle layer 12 and an outer layer 13. An artificial passive film (APF) 101 is formed on the outer surface of the active material 11 and covers the active material 11 to prevent or reduce the gel/liquid electrolytes to contact with the active material 11. Therefore, the artificial passive film (APF) 101 may be considered as an inner layer. The APF 101 includes non-solid electrolyte series and solid electrolyte series based on the ion transfer or not. The thickness of the APF 101 is substantially less than 100 nanometers. The non-solid electrolyte series may include conductive materials, lithium-free ceramic materials and the combinations thereof. The conductive materials include a carbonaceous material or a conductive polymer, and the lithium-free ceramic materials include a zirconia, a silica, an alumina, a titania or a gallium oxide. Moreover, when the APF 101 is composed of the lithium-free ceramic materials, the APF 101 may be formed by a mechanical deposition, a physical/chemical deposition or the combinations thereof. For mechanical deposition, the ball mill or the Fluidized bed may be used. The thickness of the APF 101 is substantially less than 100 nanometers thereof. Also, by the physical/chemical deposition, the film structure with atomic-scale stacked is formed. The thickness of the APF 101 may be substantially less than 20 nanometers thereof. Also, when the APF 101 is composed of the conductive materials, the APF 101 may be formed by the same methods.

For such the APF 101 composed of the non-solid electrolyte series, the additional electrolyte is necessary as a media to transfer ions, in case of the thickness of the APF 101 being thicker. In case of the thickness of the APF 101 being thinner, such as the atomic-scale stacked film structure, the ion transfer could be made directly.

The solid electrolyte series may include oxide-based solid electrolyte, sulfide solid electrolyte, lithium-aluminum alloy solid electrolyte or $LiN_3$ solid electrolyte, which may be crystalline or glassy. When the APF 101 is composed of the carbonaceous material of the conductive materials, the carbonaceous material may be a graphite or a graphene, or a conductive polymer. In practice, the structure in FIG. 2 is better than the structure in FIG. 3. Also, in FIG. 2, the APF 101 is composed of solid electrolyte series preferably.

As above-mentioned, based on the ion transfer or not, the APF 101 may complete cover the active material 11, the APF 101 has pores to allow the gel/liquid electrolytes to contact the surface of the active material 11, or the combinations.

Take FIG. 2 for example, the APF 101 complete covers the active material 11 to prevent the gel/liquid electrolytes to contact the active material 11. Take FIG. 3 for example, the APF 101 has pores to allow the gel/liquid electrolytes to contact the surface of the active material 11. The APF 101 may be formed by powder-stacked non-solid electrolyte series. The powders-stacked structure may form pores to reduce the contact with the gel/liquid electrolytes and the active material 11. Also, the powders-stacked structure would support the solid electrolyte interface (SEI) layer, which is formed on the surface of the active material 11, to increase chemical, electrochemical and thermal stability. Therefore, the crack and the rebuilding of the SEI layer may be avoided to decrease the lithium ion consumption. In FIGS. 2-3, the thickness of the APF 101 is about several to dozens of nanometers.

Then the following paragraph describe the middle layer 12 outside the APF 101 and the outer layer 13 outside the middle layer 12. The middle layer 12 includes a first solid electrolyte 122 and a first gel/liquid electrolyte 121, and the outer layer 13 includes a second solid electrolyte 132 and a second gel/liquid electrolyte 131. In order to facilitate understanding the structure, the manufacturing process of an electrode is described firstly. General speaking, the electrode 10 is mixed with the active material 11, a conductive material, a binder and the gel/liquid electrolyte including the organic solvent and the lithium salt. In this invention, the APF 101 is formed on the surface of the active material 11. The active material 11 with the APF 101 is mixed with the conductive material, the binder and the gel/liquid electrolyte including the organic solvent and the lithium salt. Then the gel/liquid electrolyte is extracted and obtained a first volume M1 of the gel/liquid electrolyte. After the active material 11 is mixed with the conductive material and the binder, there would have a lot of holes with different sizes, result from the sizes of the particles and the material properties. In general, the slurry solvent and the active material 11 would form larger holes during drying. The diameters of the holes are about more than 500 nanometers and the distance to the artificial passive film 101 is greater than 500 nanometers. The regions of the active material 11 are mixed with more conductive material and more binder would form smaller holes. The diameters of the holes are about less than 500 nanometers and is closer to the active material 10, distributing from and outside the artificial passive film 101 to about 500 nanometers. Also, the total volume of the smaller holes is smaller than the total volume of the larger holes. Preferably, the total volume of the smaller holes is far smaller than the total volume of the larger holes.

The larger holes or the holes far away from the active material 11 are filled with more or higher concentration second solid electrolyte 132. The smaller holes or the holes closer to the active material 11 are filled with less or lower concentration first solid electrolyte 122. Then the first gel/liquid electrolyte 121 and the second gel/liquid electrolyte 131 are filled in accordance with the distances and a second volume M2 of the gel/liquid electrolyte is obtained. Therefore, the first solid electrolyte 122 and the first gel/liquid electrolyte 121 are filled in the holes within the range from the APF 101 to about 500 nanometers and/or the holes with diameter less than 500 nanometers to form the middle layer 12. The second solid electrolyte 132 and the second gel/liquid electrolyte 131 are filled in the holes with distances more than about 500 nanometers and/or the holes with diameter greater than 500 nanometers to form the outer layer 13. The active material 11 and related distributions in these drawings, FIG. 1-3 for example, are merely schematic and are not intended to limit the distribution of the materials. Due to some holes, which are occupied by the gel/liquid electrolytes, are filed with the first solid electrolyte 122 and the second solid electrolyte 132, the second volume M2 will not be greater than the first volume M1. Preferably, the second volume M2 will much less than the first volume M1 to significant reduce the usage amount of the gel/liquid electrolyte. The first gel/liquid electrolyte 121 and the second gel/liquid electrolyte 131 are the same or different materials. The first solid electrolyte 122 and the second solid electrolyte 132 are the same or different materials.

Thus, the content of the first gel/liquid electrolyte 121 is more than the content of the first solid electrolyte 122 in the middle layer 12. The content of the second solid electrolyte 132 is more than the content of the second gel/liquid electrolyte 131 in the outer layer 13. It is unquestionable that both the middle layer 12 and the outer layer 13 are include the conductive materials and the binder result from forming the electrode. In general, a volume of the first gel/liquid electrolyte 121 of the middle layer 12 is greater than 50% of total volume of the first gel/liquid electrolyte 121 and the first solid electrolyte 122 of the middle layer 12, preferably is greater than 90%. A volume of the second solid electrolyte 132 of the outer layer 13 is greater than 50% of total volume of the second gel/liquid electrolyte 131 and the second solid electrolyte 132 of the outer layer 13, preferably is greater than 90%. Therefore, both of the improved safety, reduced the amount of the gel/liquid electrolyte, and the better ion-conduction, solving the problems of less and poor contact surface between the solid electrolyte and the active material and the high resistance of the charge transfer, are achieved.

The middle layer 12 is directly contacted to the active material 11 (or the APF 101) to transfer ions. If the middle layer 12 is mainly composed of the solid electrolyte, that would face the same problems as the conventional art, such as less and poor contact surface between the solid electrolyte and the active material and the high resistance of the charge transfer. Therefore, the middle layer 12 is mainly composed of the gel/liquid electrolyte. The content of the first gel/liquid electrolyte 121 is more than the content of the first solid electrolyte 122. The volume of the first gel/liquid electrolyte 121 of the middle layer 12 is greater than 50% of total volume of the first gel/liquid electrolyte 121 and the first solid electrolyte 122 of the middle layer 12, preferably is greater than 90%, to offer a better non-directional ion-conduction. Also, the state of the contact surface between the first gel/liquid electrolyte 121 to the active material 11 (or the APF 101) is much better than the contact surface for the solid electrolyte to the active material. The charge transfer interface resistances are reduced. A distance between the middle layer 12 and the artificial passive film 101 is not greater than 500 nanometers, or the first gel/liquid electrolyte 121 and the first solid electrolyte 122 of the middle layer 12 are filled into holes with a diameter less than about 500 nanometers.

A distance between the outer layer 13 and the artificial passive film 101 is greater than 500 nanometers, or the second gel/liquid electrolyte 131 and the second solid electrolyte 132 of the outer layer 13 are filled into holes with a diameter greater than about 500 nanometers. Therefore, the middle layer 12 is mainly composed of the solid electrolyte. The volume of the second solid electrolyte 132 of the outer layer 13 is greater than 50% of total volume of the second gel/liquid electrolyte 131 and the second solid electrolyte 132 of the outer layer 13, preferably is greater than 90%. The usage amount of the organic solvent (the gel/liquid electrolyte) are reduced to acquire better thermal performance and maintain safety. In the outer layer 13, the direction of the ion conduction is determined by the contact of particles of the solid electrolyte. Therefore, the ion conduction is in a specific direction to allow the lithium ions to perform high speed and bulk transport.

The solid electrolyte of the middle layer 12 and the outer layer 13 may be the same as above mentioned solid electrolyte of the APF 101.

Further materials illustrations for the above solid electrolyte are described below. The sulfide solid electrolyte may be a glassy $Li_2S$—$P_2S_5$, a crystalline $Li_xM_yPS_z$, a glassy ceramic $Li_2S$—$P_2S_5$ or the combination thereof.

where M is Si, Ge, Sn or the combination;

$$x'+4y'+5=2Z', \ 0 \leq y' \leq 1.$$

The glassy $Li_2S$—$P_2S_5$ may be glassy $70Li_2S$-$30P_2S_5$, $75Li_2S$-$25P_2S_5$, $80Li_2S$-$20P_2S_5$ or the combination. The glassy ceramic $Li_2S$—$P_2S_5$ may be glassy ceramic $70Li_2S$-$30P_2S_5$, $75Li_2S$-$25P_2S_5$, $80Li_2S$-$20P_2S_5$ or the combination. The $Li_xM_yPS_z$, may be $Li_3PS_4$, $Li_4SnS_4$, $Li_4GeS_4$, $Li_{10}SnP_2S_{12}$, $GPS_{12}$, $Li_{10}SiP_2S_{12}$, $Li_{10}GeP_2S_{12}$, $Li_7P_3S_{11}$, $L_{9.5}Si_{1.74}P_{1.44}S_{11.7}Cl_{0.3}$, ß-$Li_3PS_4$, $Li_7P_2S_{11}$, $Li_7P_3S_{11}$, $0.4LiI$-$0.6Li_4SnS_4$, $Li_6PS_5Cl$ or the combination.

The oxide-based solid electrolyte may be a fluorite structure oxide-based solid electrolyte. For example, yttria stabilized zirconia (YSZ) with molar fraction 3-10%. The oxide-based solid electrolyte may be a $ABO_3$ oxide-based solid electrolyte, such as doping $LaGaO_3$. The oxide-based solid electrolyte may be $Li_{1+x+y}(Al, Ga)_x Ge)_{2-x}Si_yP_{3-y}O_{12}$, where $0 \leq x \leq 1$ and $0 \leq y \leq 1$. Moreover, the oxide-based solid electrolyte may be $Li_2O$—$Al_2O_3$—$SiO_2$—$P_2O_5$—$TiO_2$, $Li_2O$—$Al_2O_3$—$SiO_2$—$P_2O_5$—$TiO_2$—$GeO_2$, $Na_{33}Zr_{1.7}La_{0.3}Si_3PO_{12}$, $Li_{3.5}Si_{0.5}P_{0.5}O_4$, $Li_{3x}La_{2/3x}TiO_3$, $Li_7La_3Zr_2O_{12}$, $Li_{0.38}La_{0.56}Ti_{0.99}Al_{0.01}O_3$, $Li_{0.34}LaTiO_{2.94}$.

Of course, the remaining solid electrolytes, which are not listed in detail above, may also be used. The above list are merely illustrative and are not intended to limit the invention to the foregoing solid electrolytes.

Figure 4:
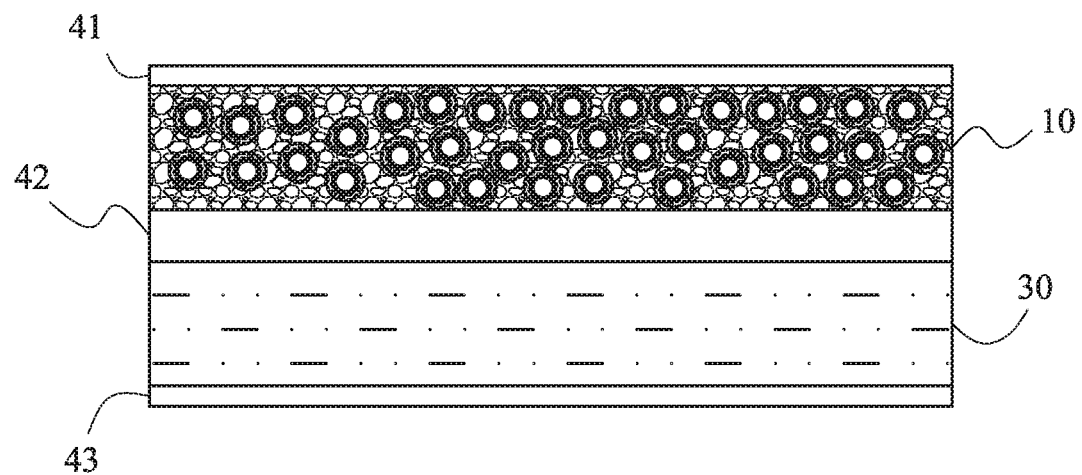
FIG. 4 is a schematic diagram of the composite electrode materials adapted for a lithium battery of this invention.
Figure 5:
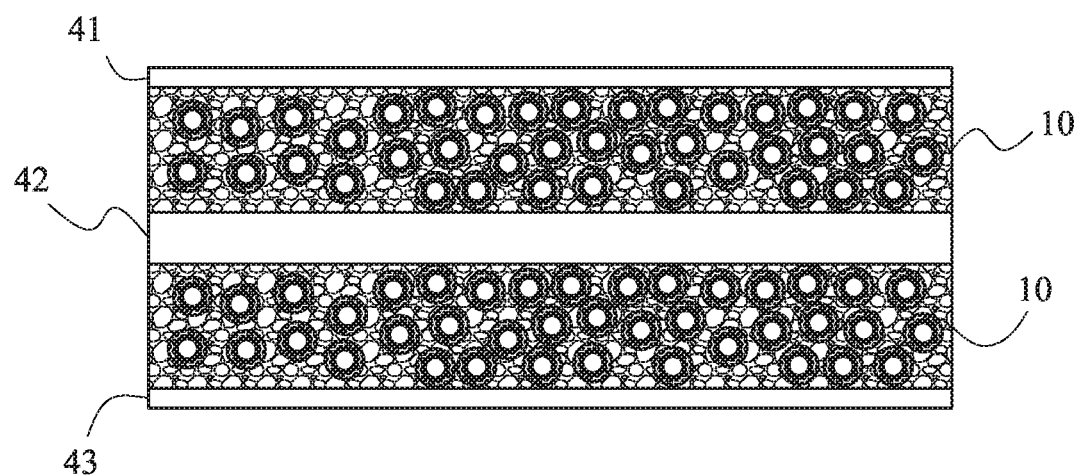
FIG. 5 is a schematic diagram of another embodiment of the composite electrode materials adapted for a lithium battery of this invention.

Practically applied to the battery systems, the composite electrode materials 10 of this invention may serves as one electrode, such as positive electrode. Please refer to FIG. 4, the composite electrode materials 10, another electrode 30, the separator 42, two current collectors 41, 43 are formed the battery system. Furthermore, both two electrodes, the positive electrode and the negative electrode, may use the composite electrode materials 10 of this invention, see FIG. 5.

Accordingly, in this invention, the artificial passive film (APF) is used to efficiently prevent the liquid electrolytes to contact with the active materials. Therefore, the unnecessary lithium ion consumption and the attenuation of the lithium battery can be avoided. Also, the middle layer and the outer layer constructed with different percentages of the solid electrolyte and the gel/liquid electrolyte. The outer layer may allow the lithium ions to transfer in high speed, and the middle layer offer a non-directional ion-conduction. Therefore, a better ion-conduction is achieved. The usage amount of the organic solvent (the gel/liquid electrolyte) are reduced to acquire better thermal performance and maintain safety. Furthermore, the dual electrolyte system, the solid electrolyte and the gel/liquid electrolyte, may effectively increase ion conduction. Especially, when the solid electrolyte is the oxide-based solid electrolyte, the high chemical stability is maintained and the ionic conductivity and the electrode compatibility are increased through this dual electrolyte system.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A composite electrode material, comprising:
   an active material;
   an artificial passive film, surrounding the active material;
   a middle layer, surrounding the artificial passive film, the middle layer including a first solid electrolyte and a first gel/liquid electrolyte, wherein a content of the first gel/liquid electrolyte is more than a content of the first solid electrolyte; and
   an outer layer, surrounding the middle layer, the outer layer including a second solid electrolyte and a second gel/liquid electrolyte, wherein a content of the second solid electrolyte is more than a content of the second gel/liquid electrolyte.

2. The composite electrode material of claim 1, wherein a thickness of the artificial passive film is less than 100 nanometers.

3. The composite electrode material of claim 1, wherein the artificial passive film is composed of a solid electrolyte, which totally surrounds the active material.

4. The composite electrode material of claim 1, wherein the artificial passive film is a non-solid electrolyte.

5. The composite electrode material of claim 4, wherein the artificial passive film is selected from the group consisting of conductive materials, lithium-free ceramic materials and the combinations thereof, wherein the conductive materials include a carbonaceous material or a conductive polymer, and the lithium-free ceramic materials include a zirconia, a silica, an alumina, a titania or a gallium oxide.

6. The composite electrode material of claim 1, wherein the first solid electrolyte of the middle layer and the second solid electrolyte of the outer layer are crystalline or glassy solid electrolyte.

7. The composite electrode material of claim 1, wherein a distance between the middle layer and the artificial passive film is not greater than 500 nanometers.

8. The composite electrode material of claim 1, wherein a distance between the outer layer and the artificial passive film is greater than 500 nanometers.

9. The composite electrode material of claim 1, wherein a volume of the first gel/liquid electrolyte of the middle layer is greater than 50% of total volume of the first gel/liquid electrolyte and the first solid electrolyte of the middle layer.

10. The composite electrode material of claim 9, wherein a volume of the first gel/liquid electrolyte of the middle layer is greater than 90% of total volume of the first gel/liquid electrolyte and the first solid electrolyte of the middle layer.

11. The composite electrode material of claim 1, wherein a volume of the second solid electrolyte of the outer layer is greater than 50% of total volume of the second gel/liquid electrolyte and the second solid electrolyte of the outer layer.

12. The composite electrode material of claim 11, wherein a volume of the second solid electrolyte of the outer layer is greater than 90% of total volume of the second gel/liquid electrolyte and the second solid electrolyte of the outer layer.

13. The composite electrode material of claim 1, wherein the composite electrode materials serve as a positive or/and a negative electrode of a lithium battery.

14. The composite electrode material of claim 1, wherein the first gel/liquid electrolyte and the first solid electrolyte of the middle layer are filled into holes with a diameter less than about 500 nanometers, and the second gel/liquid electrolyte and the second solid electrolyte of the outer layer are filled into holes with a diameter greater than about 500 nanometers.

* * * * *